United States Patent
Shimizu et al.

(10) Patent No.: US 6,856,870 B2
(45) Date of Patent: Feb. 15, 2005

(54) POWER STEERING SYSTEM

(75) Inventors: Noboru Shimizu, Setagaya-ku (JP);
Tsunefumi Arita, Kamo-gun (JP);
Naoto Shima, Iwakura (JP); Masashi Takai, Seki (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/351,133

(22) Filed: Jan. 24, 2003

(65) Prior Publication Data
US 2003/0144781 A1 Jul. 31, 2003

(30) Foreign Application Priority Data

Jan. 25, 2002 (JP) ........................................ 2002-016505
Nov. 12, 2002 (JP) ........................................ 2002-327756

(51) Int. Cl.⁷ ............................................. G06F 17/00
(52) U.S. Cl. .......................... 701/41; 701/44; 180/6.2; 180/6.28; 180/6.5; 180/422; 180/423; 180/421
(58) Field of Search ....................... 701/41, 44; 180/6.2, 180/6.28, 6.5, 422, 423, 421

(56) References Cited

U.S. PATENT DOCUMENTS

| | | | | |
|---|---|---|---|---|
| 6,484,841 B2 | * | 11/2002 | Takai et al. | 180/422 |
| 6,499,557 B2 | * | 12/2002 | Takai et al. | 180/422 |
| 6,675,928 B2 | * | 1/2004 | Takai et al. | 180/422 |
| 6,681,884 B2 | * | 1/2004 | Shimizu et al. | 180/422 |
| 2003/0141193 A1 | * | 7/2003 | Hossick-Schott | 205/104 |
| 2003/0144781 A1 | * | 7/2003 | Shimizu et al. | 701/41 |
| 2003/0144782 A1 | * | 7/2003 | Shimizu et al. | 701/41 |

* cited by examiner

Primary Examiner—William A. Cuchlinski, Jr.
(74) Attorney, Agent, or Firm—Steinberg & Raskin, P.C.

(57) ABSTRACT

A power steering system capable of giving a driver no discomfort even when an incoming current instruction value sharply decreases. The power steering system comprises a controller C for determining a solenoid current instruction value SI on the basis of a current instruction value I1 in accordance with a steering angle supplied from a steering angle sensor, a current instruction value I2 in accordance with a steering angular velocity, and a current instruction value in accordance with a vehicle speed. The controller C comprises a delay control section for reducing the rate of decrease only when the incoming current instruction value sharply decreases and outputting the resulting current instruction value.

2 Claims, 8 Drawing Sheets

POWER STEERING SYSTEM

BACKGROUND OF THE INVENTION

1. Field of the Invention

This invention relates to a power steering system including a flow control valve for the prevention of energy loss.

2. Description of Related Art

An example of power steering systems including a flow control valve for the prevention of energy loss is disclosed in Laid-open Japanese Patent Application No. 2001-260917 (Patent document 1) filed by the present applicant.

As shown in FIG. 6, the flow control valve V of the power steering system of the prior art example includes a spool 1 having one end adjoining a pilot chamber 2 and the other end adjoining another pilot chamber 3.

The pilot chamber 2 continuously communicates with a pump P via a pump port 4. Further, the pilot chamber 2 communicates via a flow path 6, a variable orifice a and a flow path 7 with an inflow port of a steering valve 9 provided for controlling a power cylinder 8.

The pilot chamber 3 incorporates a spring 5 and also communicates with the inflow port of the steering valve 9 via a flow path 10 and the flow path 7. Accordingly, the pilot chambers 2 and 3 communicate with each other via the variable orifice a, the flow path 7 and the flow path 10. Pressure upstream from the variable orifice a acts on the pilot chamber 2, and pressure downstream therefrom acts on the pilot chamber 3. The degree of opening of the variable orifice a is controlled by a solenoid current instruction value SI for a solenoid SOL.

The spool 1 maintains a position at which the force acting on the pilot chamber 2, the force acting on the pilot chamber 3, and the force of the spring 5 are in balance. This balanced position determines the degree of opening of a tank port 11.

For example, upon actuation of a pump driving source 12 such as an engine or the like, the pump P is driven to supply pressure oil to the pump port 4 to cause a flow in the variable orifice a. This flow produces a pressure difference between the two sides of the variable orifice a, and the pressure difference causes a difference in pressure between the pilot chambers 2 and 3. The resultant differential pressure resists the force of the spring 5 and moves the spool 1 from the normal position, illustrated in FIG. 6, to the balanced position.

Thus, moving the spool 1 from the normal position toward the balanced position increases the degree of opening of the tank port 11. In accordance with the resultant degree of opening of the tank port 11, the distribution ratio between a control flow QP introduced toward the steering valve 9 from the pump P and a return flow QT circulating back to a tank T or the pump P is determined. In other words, the control flow QP is determined in accordance with the degree of opening of the tank port 11.

The control of the control flow QP in accordance with the degree of opening of the tank port 11 results in determination of the control flow QP in accordance with the degree of opening of the variable orifice a. This is because the position to which the spool 1 is shifted, which determines the degree of opening of the tank port 11, is determined by the differential pressure between the two pilot chambers 2 and 3, and this differential pressure is determined by the degree of opening of the variable orifice a.

Thus, in order to control the control flow QP in accordance with the vehicle speeds or steering conditions of the vehicle, the degree of opening of the variable orifice a, or the solenoid current instruction value SI for the solenoid SoL may be controlled. This is because the degree of opening of the variable orifice a is controlled selectively varying from a minimum to a maximum according to an exciting current of the solenoid SOL.

The steering valve 9 applied with the control flow QP controls the amount of oil supplied to the power cylinder 8 in accordance with the input torque (steering torque) of the steering wheel (not shown). For example, if the steering torque is large, the amount of shifting of the steering valve 9 is increased to increase the amount of oil supplied to the power cylinder 8, whereas if it is small, the amount of shifting of the steering valve 9 is decreased to decrease the amount of oil supplied to the power cylinder 8. The higher the amount of the pressure oil supplied, the higher the assist force that the power cylinder 8 exerts, and the smaller the amount of the pressure oil supplied, the lower the assist force that the power cylinder 8 exerts.

The steering torque and the amount of shifting of the steering valve 9 are determined by a torsion reaction of a torsion bar (not shown) or the like.

As described above, the steering valve 9 controls a flow QM supplied to the power cylinder 8, and the flow control valve V controls the control flow QP supplied to the steering valve 9. If the flow QM required by the power cylinder 8 comes as close as possible to the control flow QP determined by the flow control valve V, it is possible to reduce the energy loss around the pump P. This is because the energy loss around the pump P is caused by a difference between the control flow QP and the flow QM required by the power cylinder 8.

In order to make the control flow QP as close as possible to the flow QM required by the power cylinder 8 for the prevention of energy loss, the system of the prior art example controls the degree of opening of the variable orifice a. The degree of opening of the variable orifice a is determined by the exciting current applied to the solenoid SOL as described earlier. A controller C, described below in detail, controls the exciting current.

The controller C is connected to a steering angle sensor 14 and a vehicle speed sensor 15. As illustrated in FIG. 7, the controller C determines a current instruction value I1 based on the steering angle detected by the steering angle sensor 14, and also a current instruction value I2 based on the steering angular velocity calculated by differentiating the detected steering angle.

The relationship between the steering angle and the current instruction value I1 is determined on the basis of theoretical values giving linear characteristics to the relationship between the steering angle and the control flow QP. The relationship between the steering angular velocity and the current instruction value I2 is also determined on the basis of the theoretical values giving linear characteristics to the relationship between the steering angular velocity and the control flow QP. Both of the current instruction values I1 and I2 are outputted at zero unless the steering angle and the steering angular velocity exceed a set value. Specifically, when the steering wheel is positioned at or around the center, the current instruction values I1 and I2 are outputted at zero in order to set a dead zone around the center.

Further, the controller C outputs a steering angle-related current instruction value I3 and a steering angular velocity-related current instruction value I4 which are based on the value detected by the vehicle speed sensor 15.

The steering angle-related current instruction value I3 is outputted at 1 at low vehicle speeds and, for example, at 0.6 at maximum vehicle speeds. The steering angular velocity-related current instruction value I4 is outputted at 1 at low vehicle speeds and, for example, at 0.8 at maximum vehicle speeds. Specifically, regarding gain in a range from low vehicle speeds to maximum vehicle speeds, the steering angle-related current instruction value I3 controlled in the range of 1 to 0.6 is set to be larger than the steering angular velocity-related current instruction value I4 controlled in the range of 1 to 0.8.

Then, the steering angle-related current instruction value I3 is multiplied by the steering angle-based current instruction value I1. Hence, the steering angle-based current instruction value I5 resulting from this multiplication becomes smaller as the vehicle speed increases. In addition, the steering angle-related current instruction value I3 has gain set larger than that of the steering angular velocity-related current instruction value I4. Accordingly, the faster the vehicle speed becomes, the higher the rate of decrease of the value I5 becomes. That is to say, response is kept high at low vehicle speeds and is reduced at high vehicle speeds. Thus, the response is changeable depending on a vehicle speed. This is because a high response is not usually required during high-speed travel but is necessary at low vehicle speeds in most cases.

The controller C applies the steering angular velocity-related current instruction value I4 serving as a limiting value to the current instruction value I2 based on the steering angular velocity to output a steering angular velocity-based current instruction value I6. This current instruction value I6 is also reduced in accordance with the vehicle speed. However, the gain of the steering angular velocity-related current instruction value I4 is set to be smaller than that of the steering angle-related current instruction value I3, so that the rate of decrease of the current instruction value I6 is smaller than that of the current instruction value I5.

The limiting value, as described above, is set in accordance to a vehicle speed in order to mainly prevent an excessive assist force from being exerted during high-speed travel.

The controller C make a comparison between the steering angle-based current instruction value I5 and the steering angular velocity-based current instruction value I6, and adopts the larger value of the two.

For example, the steering wheel is rarely rotated abruptly during high-speed travel, and therefore typically the steering angle-based current instruction value I5 is larger than the steering angular velocity-based current instruction value I6. Accordingly, in most cases, the steering angle-based current instruction value I5 is selected in high-speed travel. A large gain of the current instruction value I5 is set in order to enhance the safety and stability of operation of the steering wheel at this point. In other words, as the traveling speed increases, the ratio of decreasing the control flow QP is increased for enhancement the safety and stability on traveling.

On the other hand, the steering wheel is often rotated abruptly during low-speed travel, so that the steering angular velocity-based current instruction value I6 becomes larger in many cases than the steering angle-based current instruction value I5. Because of this, the steering angular velocity-based current instruction value I6 is selected in most cases during low-speed travel. When the steering angular velocity is high, the response is regarded as being of importance.

Thus, in low-speed travel, the steering angular velocity is used as the referred, and a small gain of the steering angular velocity-based current instruction value I6 is set in order to enhance the operability of the steering wheel, or the response. In other words, if the traveling speed is somewhat increased, the control flow QP ensured to a sufficient degree makes it possible to ensure the response when the steering wheel is abruptly rotated.

The controller C adds a standby current instruction value I7 to the current instruction value I5 or I6 selected as described above, and outputs the resultant value of the addition to a driving unit 16 as a solenoid current instruction value SI.

Due to the addition of the standby current instruction value I7, the solenoid current instruction value SI is kept at the predetermined magnitude even when all the current instruction values based on the steering angles, the steering angular velocities and the vehicle speeds are at zero. For this reason, a predetermined oil flow is supplied to the steering valve 9 at all times. In terms of the prevention of energy loss, the control flow QP in the flow control valve V is ideally zero when the flow QM required by the power cylinder 8 and the steering valve 9 is zero. Specifically, reducing the control flow QP to zero means causing the total amount of oil discharged from the pump P to return back to the pump P or the tank T from the tank port 11. The path of the oil flow returning from the tank port 11 to the pump P or the tank T is extremely short in the main body B, so that little pressure loss occurs. Due to the significantly low degree of pressure loss, the driving torque of the pump P is lessened to a minimum, resulting in energy conservation. In this context, with regard to the prevention of energy loss, the control flow QP has the advantage of being reduced to zero when the required flow QM is zero.

Nevertheless, a standby flow QS is maintained even when the required flow QM is zero. This is because of the following.

(1) To prevent seizure in the system. The circulation of the standby flow QS through the system can provide cooling effects.

(2) To ensure response. The maintenance of the standby flow QS as described above results in a reduction of the time required for attaining the target control flow QP as compared with the case of absence of maintenance of the standby flow QS. The resultant time difference affects the response. As a result, the maintenance of the standby flow QS leads to improvement in the response.

(3) To counter disturbances, such as kickback and the like, and self-aligning torque. The reaction to disturbances or self-aligning torque acts on the wheels, which then acts on the rod of the power cylinder 8. If the standby flow is not maintained, the reaction to the disturbances or self-aligning torque makes the wheels unsteady. However, the maintenance of the standby flow prevents the wheels from becoming unsteady even when the reaction as described above acts on the wheels. Specifically, the rod of the power cylinder 8 engages with a pinion and the like for switching the steering valve 9. Upon the onset of the reaction, the steering valve is also switched to supply the standby flow in a direction counter to the reaction. Therefore, maintaining the standby flow makes it possible to counter the self-aligning torque and the disturbance caused by kickback.

Next, a description will be given of the operation of the power steering system of the prior art example.

When the vehicle is travelling, the controller C outputs a steering angle-based current instruction value I5 resulting from multiplication of a solenoid current instruction value I1 based on the steering angle by a steering angle-related current instruction value I3, and also outputs a steering angular velocity-based current instruction value I6. The current instruction value I6 is obtained by applying a steering angular velocity-related current instruction value I4 serving as a limiting value to the steering angular velocity-based solenoid current instruction value I2.

Next, the steering angle-based current instruction value I5 and the steering angular velocity-based current instruction value I6 are compared to select the larger value which then is added to a standby current instruction value I7 to determine a solenoid current instruction value SI at this point. The solenoid current instruction value SI is mainly determined with reference to the steering angle-based current instruction value I5 when the vehicle travels at high speeds, and to the steering angular velocity-based current instruction value I6 when travelling at low speeds.

The spool 1 has a slit 13 formed at its leading end. The slit 13 makes communication between the pilot chamber 2 and the variable orifice a even when the spool 1 is in the normal position as illustrated in FIG. 6. Specifically, even when the spool 1 is in the normal position, the pressure oil supplied from the pump port 4 to the pilot chamber 2 is further supplied to the steering valve 9 via the slit 13, the flow path 6, the variable orifice a, and the flow path 7. Due to such supply of the pressure oil, the system successfully achieves the prevention of seizure and disturbances such as kickback or the like, and the ensured response.

FIG. 6 illustrates a driving unit 16 provided for driving the solenoid SOL and connected to the controller C and the solenoid SOL, throttles 17 and 18, and a relief valve 19.

(Patent document 1)

Publication of Laid-open Japanese Patent Application No. 2001-260917

(pages 3–7, FIG. 1 and FIG. 2)

In the prior art power steering system as described above, for example, when the driver rotates the steering wheel to 60 degrees, then returns it to the center position, and then rotates it to 60 degrees again, as illustrated in FIG. 8, the steering angle-based and steering angular velocity-based current instruction values I1 and I2 temporarily drop to zero and then increase again. That is, the current instruction values I1 and I2 form a V line around the center position of the steering wheel, resulting in a sharp change in value.

When such a sharply changing current instruction value I1 or I2 is outputted as a solenoid current instruction value SI without further change, the control flow supplied to the steering valve 9 is also changed abruptly. This abrupt change of the control flow supplied to the steering valve 9 gives rise to the problem of making the driver feel uncomfortable with the steering.

Further, when the steering wheel is stopped at a high steering angle, the control flow does not fluctuate abruptly because a current instruction value is outputted in accordance with the steering angle. However, when the steering wheel is stopped at a low steering angle, the control flow is changed abruptly, leading to the problem of making the driver feel uncomfortable with the steering.

SUMMARY OF THE INVENTION

It is an object of the present invention to provide a power steering system which gives a driver no sense of discomfort even with an abrupt change in an incoming current instruction value.

A power steering system according to the present invention has a first feature of including: a steering valve for controlling a power cylinder; a variable orifice provided upstream from the steering valve; a solenoid for controlling a degree of opening of the variable orifice; a controller for controlling a solenoid current instruction value SI used for driving the solenoid; a steering angle sensor and a vehicle speed sensor each connected to the controller; and a flow control valve for dividing a flow, supplied from a pump, into a control flow supplied to the steering valve in accordance with the degree of opening of the variable orifice, and a return flow circulating back to a tank or the pump, and also in the first feature the controller determines the solenoid current instruction value on the basis of a current instruction value in accordance with a steering angle supplied from the steering angle sensor, a current instruction value in accordance with a steering angular velocity, and current instruction values in accordance with a vehicle speed, and includes a delay control section for lessening the rate of decrease only when an incoming current instruction value is abruptly decreased, and outputting the resulting current instruction value.

A power steering system according to the present invention has a second feature of including: a steering valve for controlling a power cylinder; a variable orifice provided upstream from the steering valve; a solenoid for controlling a degree of opening of the variable orifice; a controller for controlling a solenoid current instruction value SI used for driving the solenoid; a steering torque sensor and a vehicle speed sensor each connected to the controller; and a flow control valve for dividing a flow, supplied from a pump, into a control flow supplied to the steering valve in accordance with the degree of opening of the variable orifice, and a return flow circulating back to a tank or the pump, and also in the second feature the controller determines the solenoid current instruction value on the basis of a current instruction value in accordance with steering torque detected by the steering torque sensor, and a current instruction value in accordance with a vehicle speed detected by the vehicle speed sensor, and includes a delay control section for lessening the rate of decrease only when an incoming current instruction value is abruptly decreased, and outputting the resulting current instruction value.

According to the first and second features, the delay control is performed for preventing abrupt changes in a current instruction value to be outputted even when an incoming current instruction value is decreased sharply, resulting in prevention of the driver's discomfort with the steering.

DETAILED DESCRIPTION OF THE PREFERRED EMBODIMENTS

Figure 1:
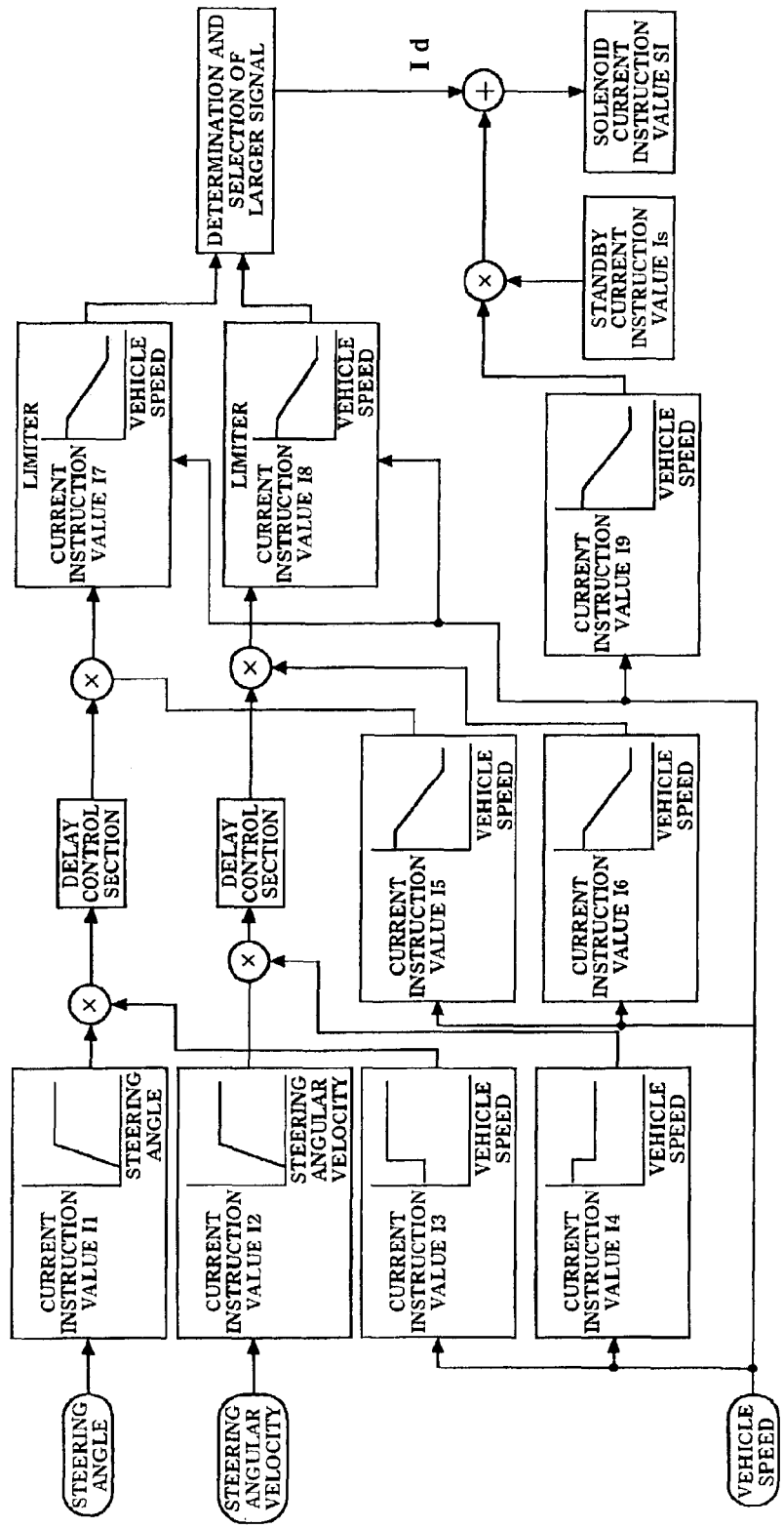
FIG. 1 is a diagram illustrating a control system of a controller C in a first embodiment.

FIG. 1 illustrates a control system of a controller C of a first embodiment according to the present invention. In the case of the first embodiment, the power steering system has the same configuration including the flow control valve V, the power cylinder 8, the steering valve 9 and so on illustrated in FIG. 6, exclusive of the controller C, as that of the prior art example which has been described earlier in FIG. 6, and a description will now be given of only the control system of the controller C.

As illustrated in FIG. 1, the controller C determines a current instruction value I1 based on the steering angle detected by the steering angle sensor 14 and a current instruction value I2 based on the steering angular velocity obtained by differentiation of the steering angle. Note that a steering angular velocity sensor may be additionally mounted, so that the controller C can determine the current instruction value I2 based on the steering angular velocity detected by the steering angular velocity sensor.

The relationship between the steering angle and the current instruction value I1 is determined on the basis of theoretical values giving linear characteristics to the relationship between the steering angle and the control flow QP. The relationship between the steering angular velocity and the current instruction value I2 is also determined on the basis of the theoretical values giving linear characteristics to the relationship between the steering angular velocity and the control flow QP.

The controller C outputs a steering angle-related current instruction value I3 and a steering angular velocity-related current instruction value I4, on the basis of a value detected by the vehicle speed sensor 15. The current instruction value I3 becomes smaller when the vehicle speed is at zero or at extremely slow speeds, and the value I3 outputted is 1 when the vehicle speed is faster than a fixed speed. The current instruction value I4 is outputted at larger than one when the vehicle speed is at zero or at extremely slow speeds, and at one when the vehicle speed exceeds a fixed speed. The controller C multiplies the steering angle-based current instruction value I1 by the current instruction value I3, and also the steering angular velocity-based current instruction value I2 by the current instruction value I4.

The multiplication of the current instruction value I1 by the current instruction value I3 based on the vehicle speed is performed in order to prevent energy loss when the vehicle stops or is driven at extremely low speeds with the steering wheel being rotated. For example, when the vehicle is driven into a garage, it is sometimes parked with the steering wheel rotated and the engine running. Even in such a case, the current instruction value I1 determined in accordance with the steering angle is outputted as a solenoid current instruction value SI, so that an unnecessary oil flow is supplied to the steering valve 9. In order to prevent energy loss in such a case, when the vehicle speed is at zero or at extremely slow speeds, the current instruction value I3 is multiplied to decrease the steering angle-based current instruction value I1.

However, if the current instruction value I3 is decreased as described above, the response of the steering wheel becomes poorer when the driver starts turning the steering wheel held in an already-rotated position. For this reason, the controller C multiplies the steering angular velocity-based current instruction value I2 by the current instruction value I4 outputted at a large value when the vehicle speed is zero or extremely low, for ensuring an adequate response.

After the current instruction values I1 and I2 are respectively multiplied by the current instruction values I3 and I4 based on the vehicle speed, a delay control section performs delay control on the values (I1×I3) and (I2×I4) obtained by the multiplication.

Figure 2:
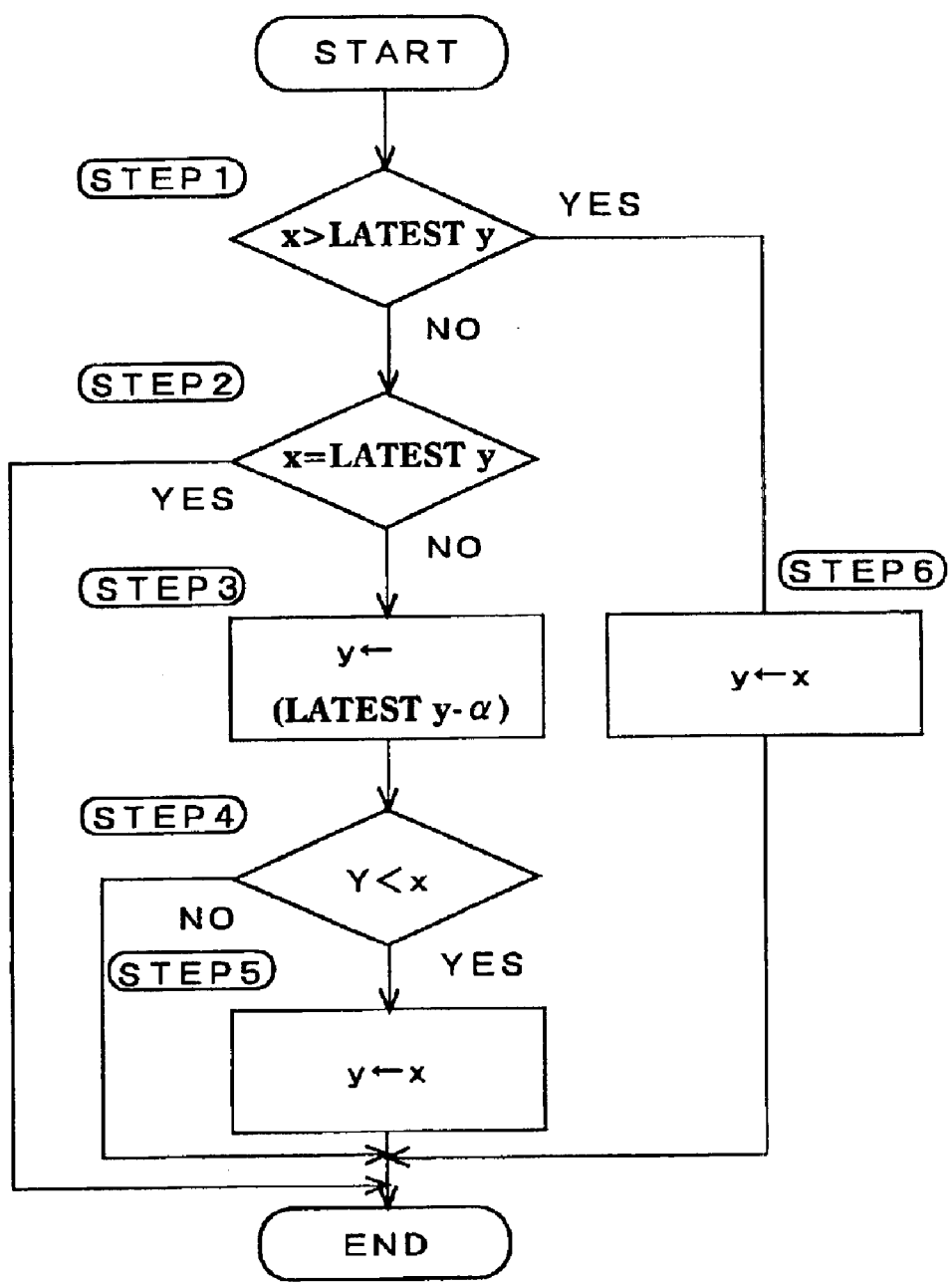
FIG. 2 is a flow chart showing the processes of a delay control section for a steering angle-based current instruction value.

The delay control is here described by taking the case of the steering angle as an example. Assuming an incoming current instruction value is x and a current instruction value to be outputted is y, as shown in FIG. 2, the delay control section determines whether or not a new input value x is larger than a latest output value y at step 1. If it is larger, the process proceeds to step 6 to substitute the input value x for a new output value y and output the resulting output value y. If the input value x is smaller than the latest output value y, the process moves to step 2 to determine whether or not the input value x is equal to the latest output value y. If it is equal, the input value x is outputted directly as an output value y. If it is not equal to the latest output value y, the process goes to step 3.

The control section subtracts a fixed value α from the latest output value y and determines the resultant value "Y−α" as a new output value y at step 3. At step 4, the delay control section determines whether or not the new output value y is smaller than the input value x. If it is larger than the input value x, the delay control section outputs the new output value y. If it is smaller than the input value x, the delay control section outputs the input value x as a new output value y.

In short, when an input value x decreases so as to be lower than a latest output value y, if the amount of decrease is below the set value α, the delay control section outputs the input value x without change. However, if the amount of decrease exceeds the set value α, the delay control section outputs a value resulting from subtraction of the set value α from the latest output value y.

Figure 3:
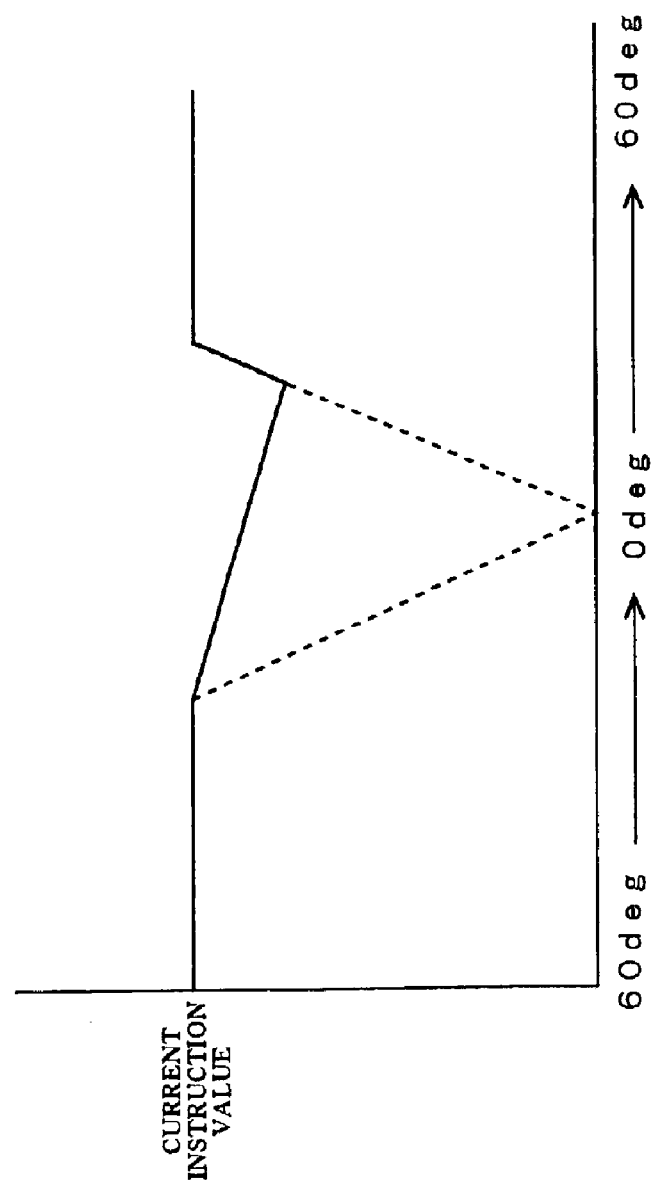
FIG. 3 is a graph showing changes in a current instruction value undergoing delay control.

With the delay control, as illustrated in FIG. 3, even if the steering wheel is rotated 60 degrees, then returned to the center position, and then rotated 60 degrees again, the rate of decrease of the current instruction value to be outputted can be small.

Reducing the rate of decrease enables the prevention of abrupt fluctuation in a current instruction value to be outputted even when an incoming current instruction value is sharply decreased, resulting in prevention of causing discomfort to the driver.

The delay control is carried out on the steering angular velocity-based current instruction value in the same way as on the steering angle-based current instruction value.

After completion of the delay control, the controller C multiplies the resulting current instruction values by the corresponding current instruction values I5, I6 each set on the basis of the vehicle speed. Each of the current instruction values I5, I6 is outputted at one at low vehicle speeds, and at a value of a decimal below one at maximum vehicle speeds. Accordingly, the controller C outputs the input value without change at low vehicle speeds, and a decreased value with an increase in the vehicle speed. In other words, a high response is maintained at low vehicle speeds and then is decreased at high vehicle speeds. The reason for the change in response in accordance with the vehicle speeds is because usually a high response is not much required in high-speed travel, whereas a high response is required at low vehicle speeds in most cases.

The controller C applies, as a limiting value, current instruction values I7, I8 each set on the basis of the vehicle speed to the corresponding current instruction values after the multiplication. Specifically, if the resultant values of the multiplication exceed the corresponding current instruction values I7, I8 based on the vehicle speed at this point, the excessive amount is eliminated for output of the current instruction values below their respective limiting values.

The limiting value based on the vehicle speed is set in order to prevent an excessive assist force from being exerted during high-speed travel.

Although the current instruction values I7 and I8 are also decreased in accordance with the vehicle speed, their gains are set to be smaller than those of the current instruction values I5, I6.

Next, the controller makes a comparison between the steering angle-based current instruction value and the steering angular velocity-based current instruction value which have been decreased below the limiting values, and selects the larger current instruction value for use as a basic current instruction value Id.

After obtaining the basic current instruction value Id, the controller C adds the standby current instruction value Is to the basic current instruction value Id. In this case, the standby current instruction value Is is not directly added, and before being added it is multiplied by a current instruction value I9 set based on the vehicle speed.

The current instruction value I9 based on the vehicle speed is outputted at one in the lower vehicle-speed range, and gradually decreased in the medium vehicle-speed range with an increase in the vehicle speed, and then maintained at the minimum level in the higher vehicle-speed range. Accordingly, a value resulting from multiplication of the vehicle-based current instruction value I9 by the standby current instruction value Is is outputted without change at low vehicle-speeds, then gradually decreased at vehicle speeds from medium toward high, and then outputted at the minimum level at high vehicle-speeds.

Lowering the standby current instruction value at high vehicle-speeds allows the prevention of unnecessary use of the standby flow at high vehicle-speeds.

The controller C is not designed to output zero as the value resulting from multiplication of the current instruction value I9 by the current instruction value Is even at high vehicle-speeds.

After completion of the addition of the standby current instruction value (Is×I9) to the basic current instruction value as described earlier, the controller C outputs the resultant value to the driving unit 16 (see FIG. 6) as a solenoid current instruction value SI. The driving unit 16 outputs an exciting current corresponding to the solenoid current instruction value SI to the solenoid SOL.

The first embodiment has the configuration including limiters individually provided for applying the current instruction values I7, I8 serving as the limiting values to the corresponding and resultant values immediately after the multiplication of the current instruction values I5, I6 serving as the gains. However, instead of the individual limiters, an across-the-board limiter may be provided for applying a vehicle speed-based current instruction value serving as a limiting value to the value resulting from the addition of the standby current instruction value.

Further, in the first embodiment, the vehicle speed-based current instruction values I5, I6 are separately multiplied as gains after the delay control is carried out. However, instead of the separate multiplication of the gains, the value selected in the value comparison may be multiplied by a vehicle speed-based current instruction value as an across-the-board gain.

Still further, an across-the-board limiter may be provided for applying a vehicle speed-based current instruction value serving as a limiting value to a value resulting from the addition of the standby current instruction value, and also the value adopted by the value comparison may be multiplied by a vehicle speed-based current instruction value as an across-the-board gain.

Figure 4:
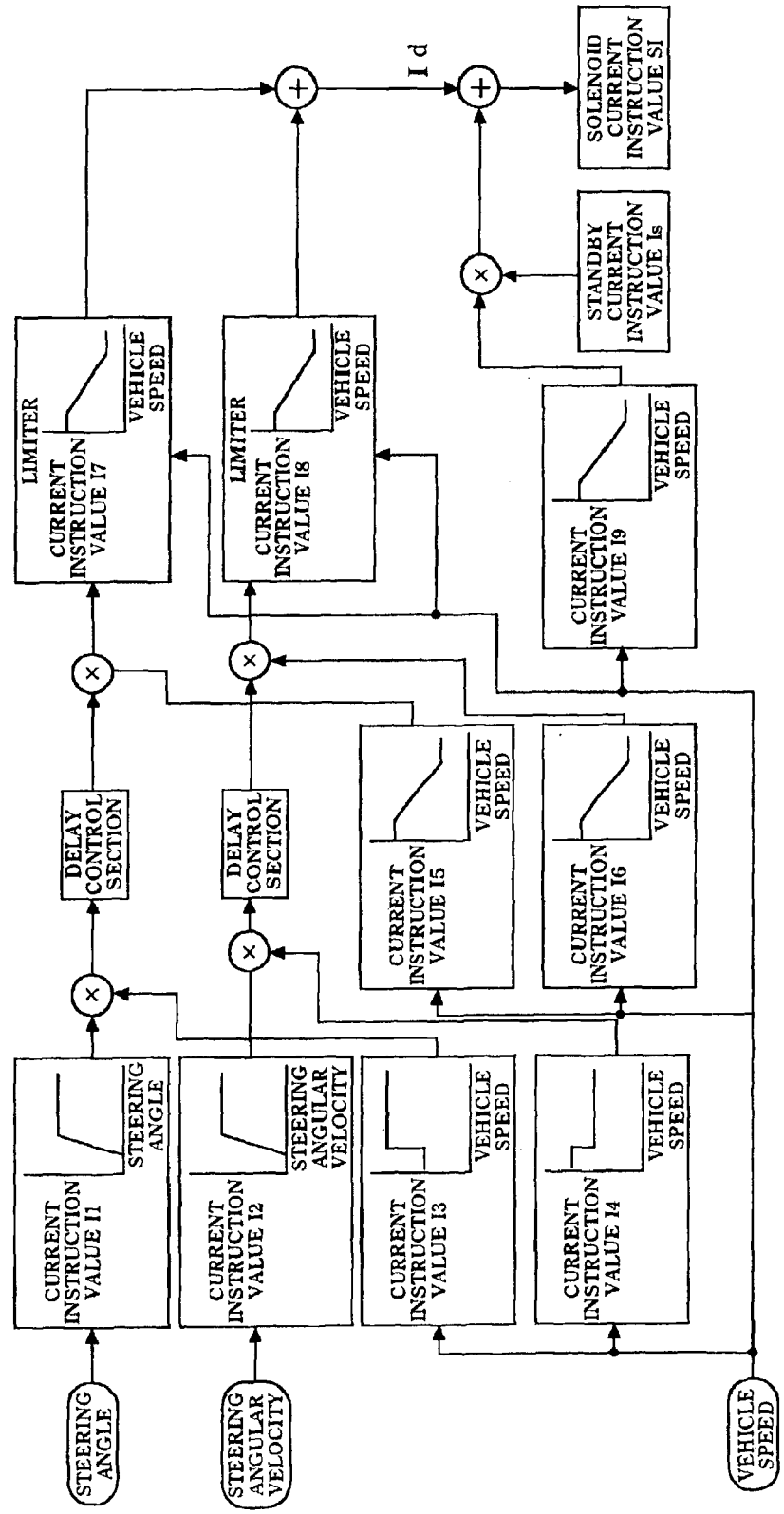
FIG. 4 is a diagram illustrating a control system of a controller C in a second embodiment.

FIG. 4 illustrates a second embodiment, in which instead of the determination of the magnitude between the steering angle-based and the steering angular velocity-based current instruction values in the first embodiment, these current instruction values are added to each other. The other configurations are the same as those in the first embodiment.

The adding of the steering angle-based current instruction value and the steering angular velocity-based current instruction value as described above, provides a solenoid current instruction value SI including both a steering angle-based characteristic and a steering angular velocity-based characteristic.

As in the case of the first embodiment, the delay control is also carried out in the second embodiment, for prevention of abrupt fluctuation in the current instruction value to be outputted even when an incoming current instruction value sharply decreases. It is thus possible to avoid making the driver feel uncomfortable with the steering.

Similarly to the first embodiment, in the second embodiment, limiters are also individually provided for applying the current instruction values I7, I8 serving as the limiting values to the resultant values immediately after the multiplication of the current instruction values I5, I6 serving as the gains. However, instead of the individual limiters, an across-the-board limiter may be provided for applying a vehicle speed-based current instruction value serving as a limiting value to the resultant value of the addition of the standby current instruction value.

Further, instead of the individual multiplication of the gain, a vehicle speed-based current instruction value may be used as across-the board gain in the multiplication.

Still further, an across-the-board limiter may be provided for applying a vehicle speed-based current instruction value serving as a limiting value to a value resulting from the addition of the standby current instruction value, and also a vehicle speed-based current instruction value may be used as across-the board gain in the multiplication as described above.

Figure 5:
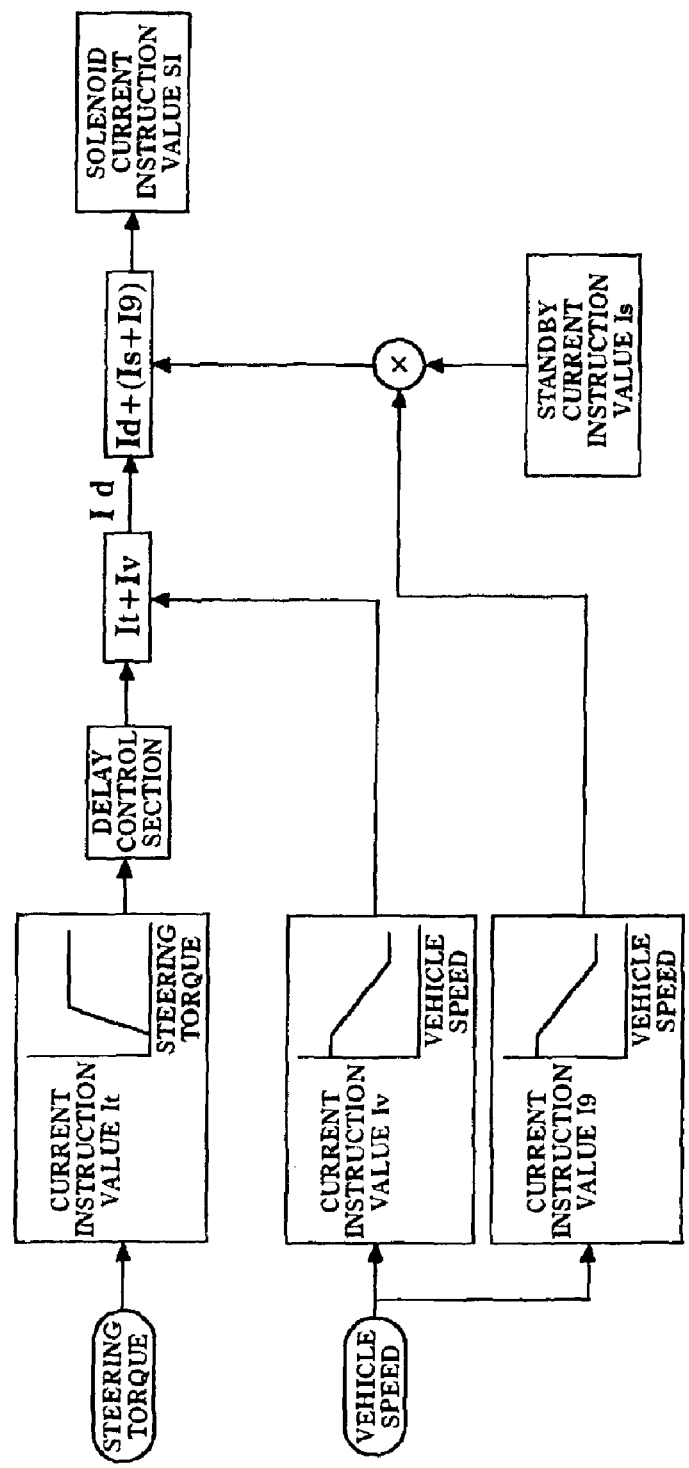
FIG. 5 is a diagram illustrating a control system of a controller C in a third embodiment.

FIG. 5 illustrates a third embodiment using steering torque to calculate the basic current instruction value Id. In the third embodiment, the controller C is connected with a steering torque sensor for detecting steering torque, and calculates the basic current instruction value Id on the basis of the current instruction value It in accordance with the detected steering torque and the vehicle speed-based current instruction value Iv. Specifically, the controller C performs the delay control on a steering torque-based current instruction value It, then multiplies the current instruction value, undergoing the delay control, by a vehicle speed-based current instruction value Iv to obtain a basic current instruction value Id, and then adds a standby current instruction value Is to the basic current instruction value Id. In the third embodiment, the vehicle speed-based current instruction value I9 is also multiplied by the standby current instruction value Is.

As described above, the third embodiment performs the delay control on the steering torque-based current instruction value It. Even when an incoming current instruction value sharply decreases, it is possible to moderately decrease the output value, resulting in avoidance of causing discomfort to the driver.

Figure 6:
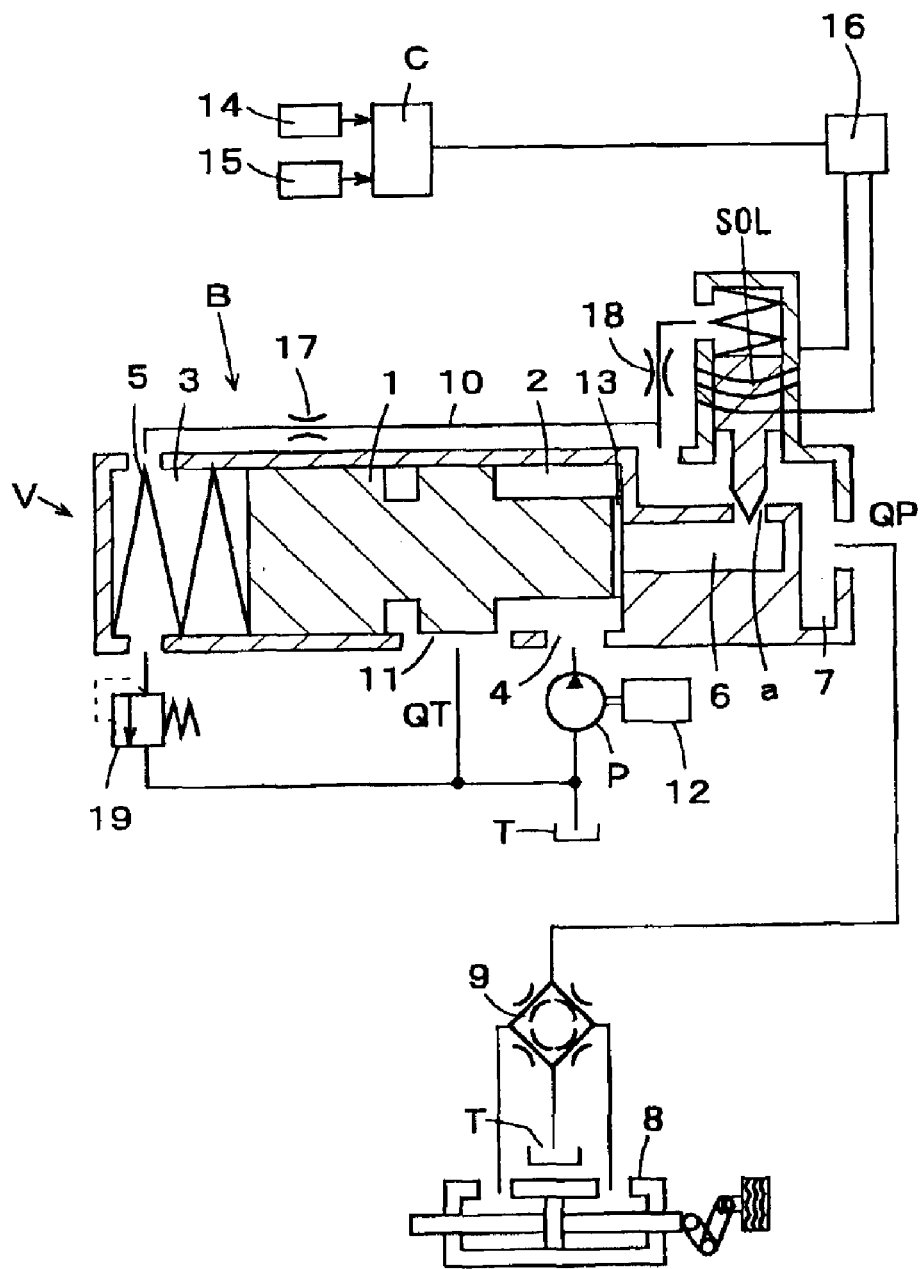
FIG. 6 is a general diagram of a power steering system in the prior art.
Figure 7:
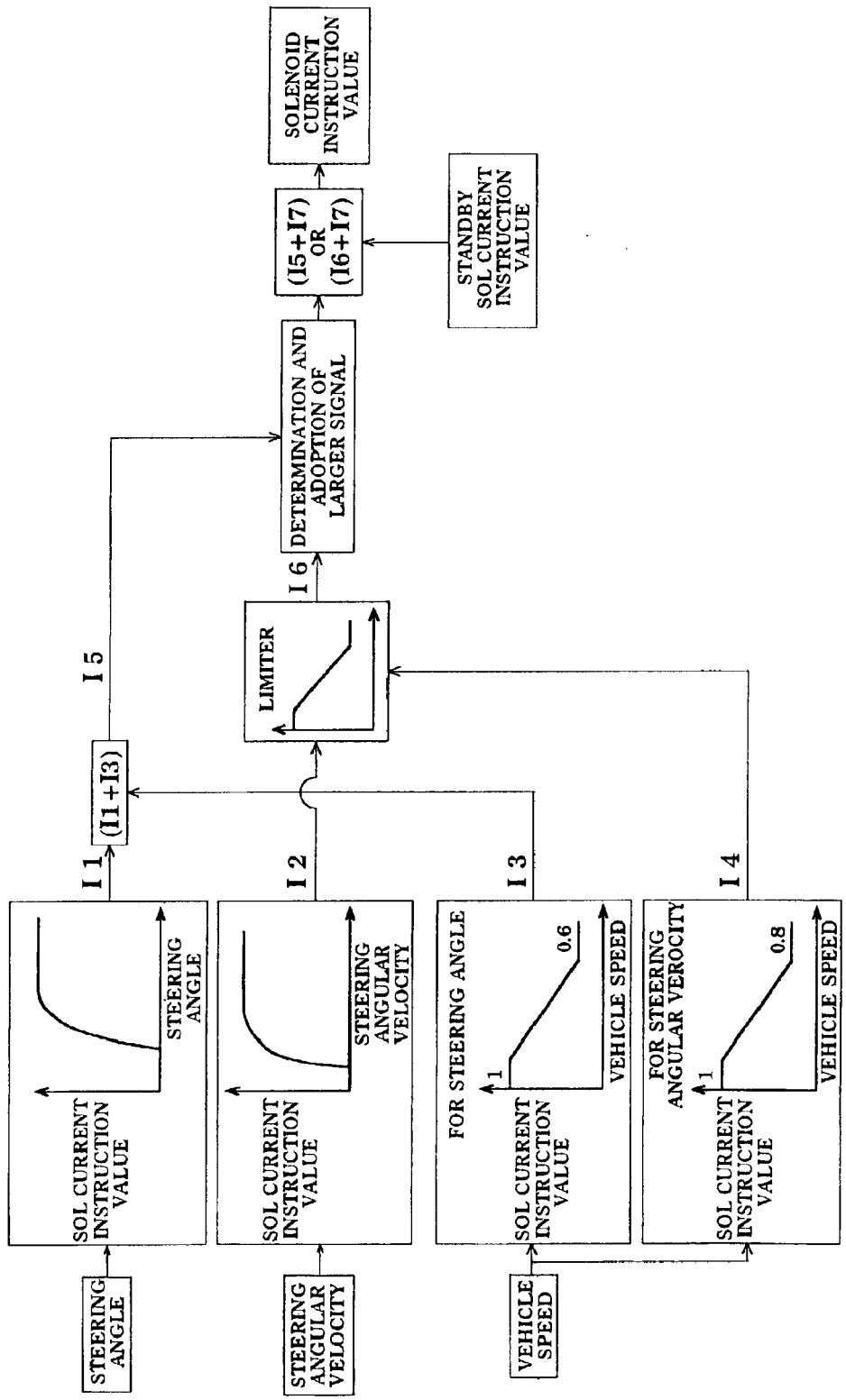
FIG. 7 is a diagram illustrating a control system of a controller C in the prior art.
Figure 8:
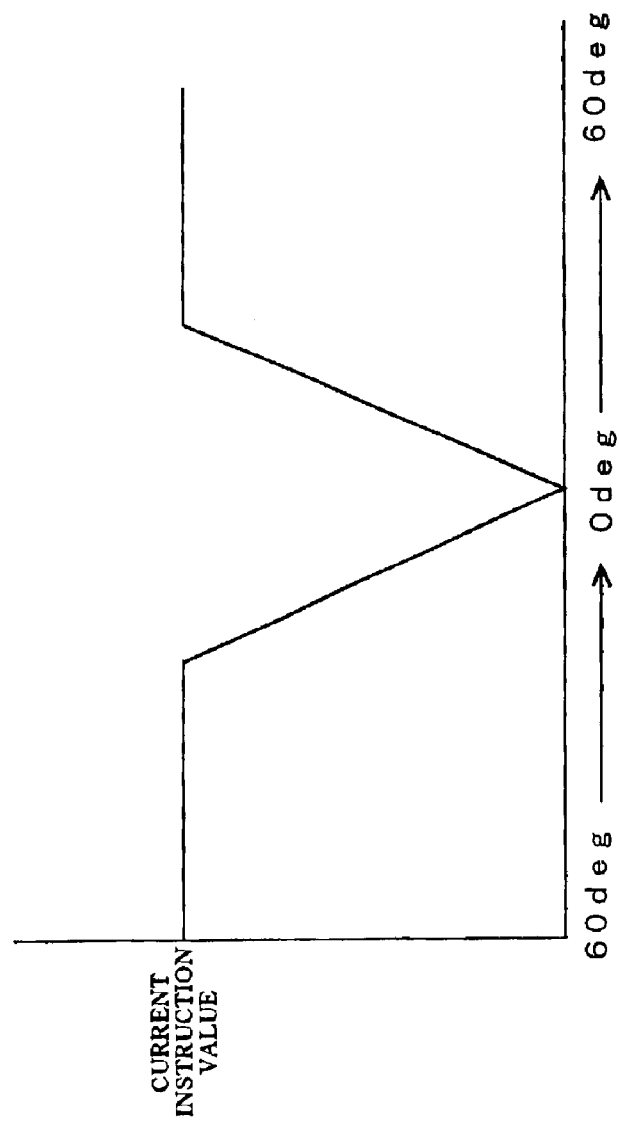
FIG. 8 is a graph showing changes in a current instruction value when steering.

In the first to third embodiments, the controller C controls the opening of the variable orifice a in the flow control valve V to eliminate production of a unnecessary flow in the control flow QP. As illustrated in FIG. 6, the control flow QP is controlled by adjusting the degree of opening of the tank port 11, that is to say, an unnecessary flow of the oil discharged from the pump P is circulated back to the tank T through the tank port 11 to adjust the control flow QP. The flow path for introducing the oil discharged from the pump P to the tank port 11 is located inside the main body B so that its length is short enough not to produce pressure loss in the flow path for circulation. Producing no pressure loss means a negligible increase in the temperature of the oil.

The first to third embodiments have a configuration in which the flow control valve V circulates the oil flow, exclusive of the control flow QP, to the tank T through the tank port 11, leading to an advantage of minimizing the increase in the temperature of the oil.

What is claimed is:

1. A power steering system, comprising:

a steering valve (9) for controlling a power cylinder (8);

a variable orifice (a) provided upstream from the steering valve (9);

a solenoid (SOL) for controlling a degree of opening of the variable orifice (a);

a controller (C) for controlling a solenoid current instruction value (SI) used for driving the solenoid (SOL);

a steering angle sensor (14) and a vehicle speed sensor (15) which are connected to the controller (C); and a flow control valve (V) for dividing a flow, supplied from a pump (P), into a control flow (QP) supplied to the steering valve (V) in accordance with the degree of opening of the variable orifice (a), and a return flow (QT) circulating back to a tank (T) or the pump (P), the controller (C) determining the solenoid current instruction value (SI) on the basis of a current instruction value (I1) in accordance with a steering angle supplied from the steering angle sensor, a current instruction value (I2) in accordance with a steering angular velocity, and current instruction values (I3, I4) in accordance with a vehicle speed, and comprising a delay control section for lessening the rate of decrease only when an incoming current instruction value is abruptly decreased, the delay control section performing delay control on values (I1×I3) and (I2×I4) obtained by multiplication, and outputting the resulting current instruction value.

2. A power steering system, comprising:

a steering valve (9) for controlling a power cylinder (8);

a variable orifice (a) provided upstream from the steering valve (9);

a solenoid (SOL) for controlling a degree of opening of the variable orifice (a);

a controller (C) for controlling a solenoid current instruction value (SI) used for driving the solenoid (SOL);

a steering torque sensor and a vehicle speed sensor (15) which are connected to the controller (C); and a flow control valve (V) for dividing a flow, supplied from a pump (P), into a control flow (QP) supplied to the steering valve (V) in accordance with the degree of opening of the variable orifice (a), and a return flow (QT) circulating back to a tank (T) or the pump (P), the controller (C) determining the solenoid current instruction value (SI) on the basis of a current instruction value (It) in accordance with steering torque detected by the steering torque sensor, and a current instruction value (Iv) in accordance with a vehicle speed detected by the vehicle speed sensor, and comprising a delay control section for lessening the rate of decrease only when an incoming current instruction value is abruptly decreased, and outputting the resulting current instruction value, wherein the delay control section performs delay control on a steering torque-based current instruction value (It), then multiplies the current instruction value (It), undergoing the delay control, by a vehicle speed-based current instruction value (Iv) to obtain a basic current instruction value (Id).

* * * * *